United States Patent [19]

Morawski

[11] 4,121,848
[45] Oct. 24, 1978

[54] CHUCK

[76] Inventor: London T. Morawski, 11487 E. Nine Mile Rd., Warren, Mich. 48090

[21] Appl. No.: 846,514

[22] Filed: Oct. 28, 1977

[51] Int. Cl.² .......................... B23B 5/22; B23B 5/34; B23B 31/12
[52] U.S. Cl. ..................................... 279/60; 279/110; 279/121
[58] Field of Search ............... 279/1 F, 60, 65, 57, 279/74, 110, 121

[56] References Cited
U.S. PATENT DOCUMENTS 3,248,122  4/1966  Roddy ................................. 279/110
3,610,645  10/1971  Roddy ................................. 279/60

Primary Examiner—Travis S. McGehee
Attorney, Agent, or Firm—Barnes, Kisselle, Raisch & Choate

[57] ABSTRACT

A chuck wherein the jaws are mounted on the outer ends of rods slideably arranged in the chuck body to incline radially and axially inwardly from the front face of the chuck. The rods are slotted on their radially outer sides for engagement with an axially shiftable actuator. The actuator and the chuck body have an axially central passageway therethrough for directing coolant to the front face of the chuck or for accommodating a workpiece ejector rod.

12 Claims, 3 Drawing Figures

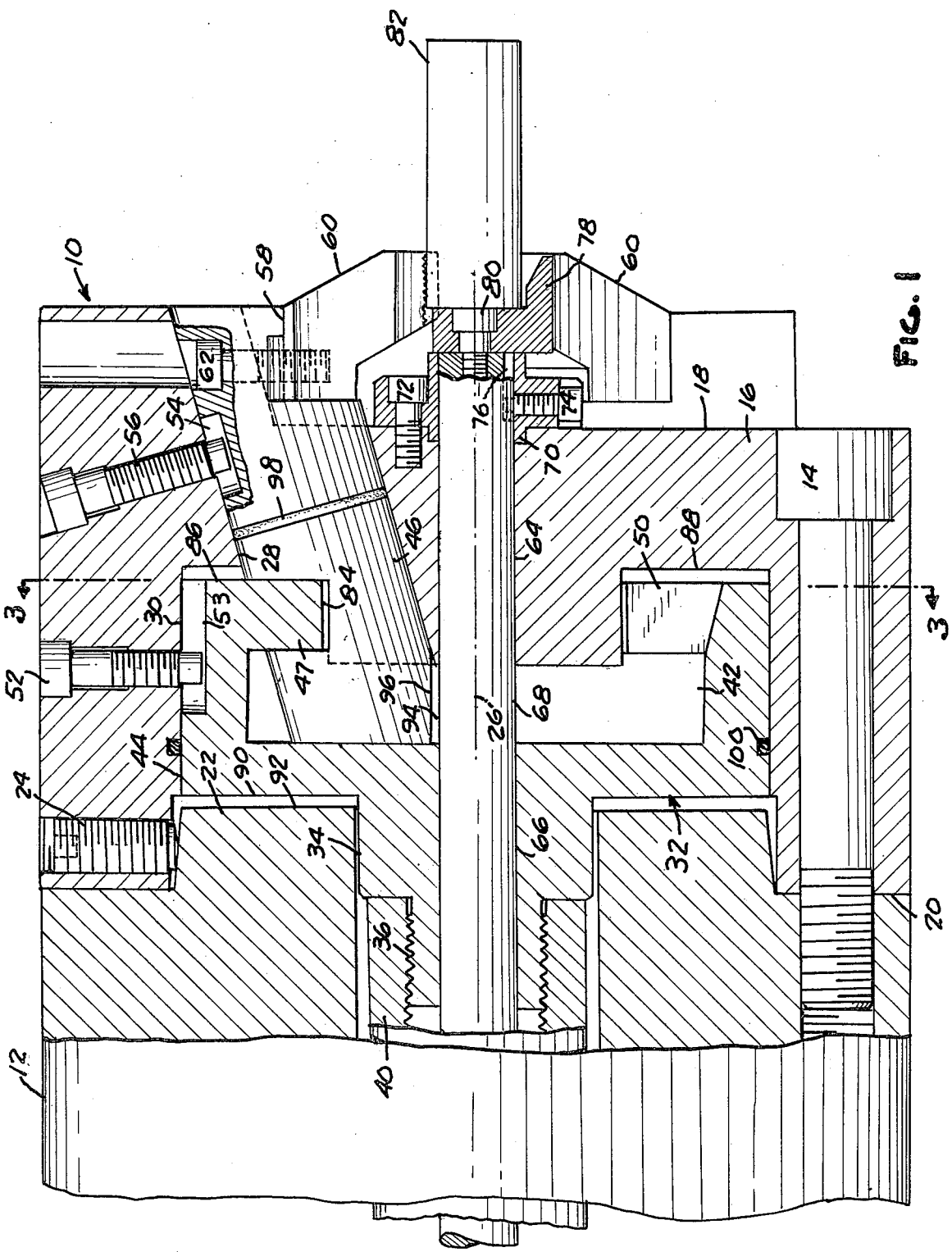

CHUCK

This invention relates to a chuck for gripping workpieces on a machine tool.

More specifically, the invention has to do with a chuck of the type wherein a plurality of circumferentially spaced jaws are displaced radially to grip and release a workpiece by means of an axially shiftable drawbar at the center of the chuck.

One particular chuck of this general type is shown in U.S. Pat. No. 3,707,292. While this patented chuck is used extensively in industry, it is not adapted for use in some specialized applications where it is necessary to provide at the axial centerline of the chuck a workpiece ejector or a passageway for accommodating coolant or for accommodating an axially inward extension on the workpiece.

Accordingly, it is the object of this invention to provide a chuck of the type described wherein the interconnection between the drawbar and the chuck actuating mechanism is designed to permit the use of a hollow drawbar with an axially extending central passageway in the body of the chuck which forms an axial extension of the passageway in the drawbar and which opens at the front face of the chuck.

Other objects, features and advantages of the present invention will become apparent from the following description and accompanying drawings, in which:

FIG. 1 is a vertical sectional view of a chuck according to the present invention;

Figure 3:
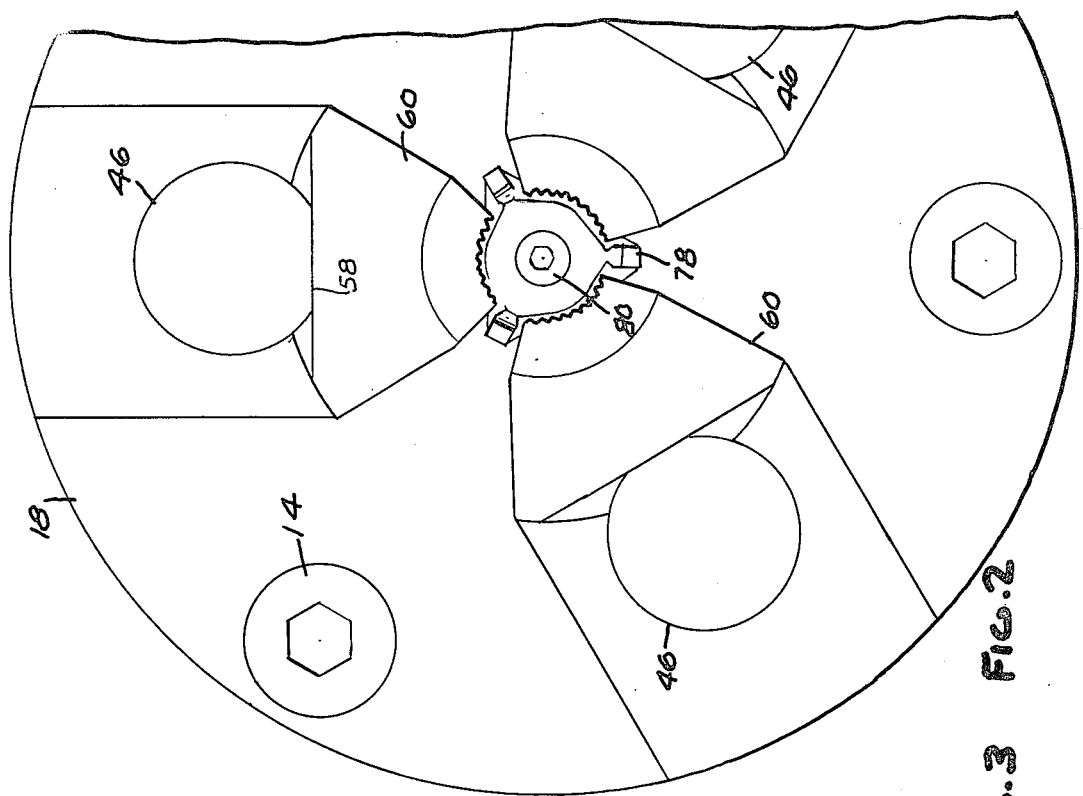
FIG. 3 is a sectional view taken along the line 3—3 in FIG. 1.
Figure 2:
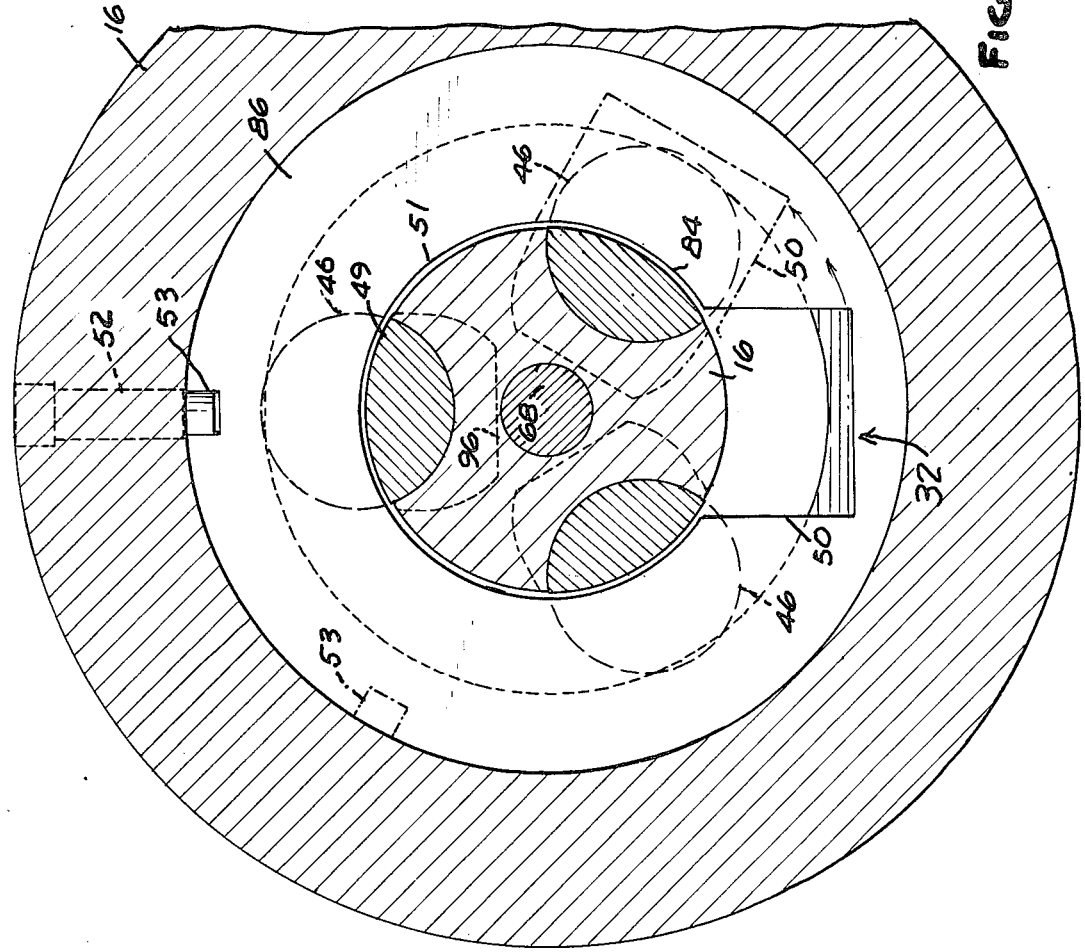
FIG. 2 is a fragmentary front elevational view of the chuck.

Referring to FIG. 1 there is illustrated a chuck, generally designated 10, of the present invention mounted on a spindle 12 of a machine tool by means of circumferentially spaced attaching bolts 14. Spindle 12 is adapted to be rotated by means on the machine tool (not illustrated). Chuck 10 comprises a body portion 16 having a front face 18 and a rear face 20. Spindle 12 has a reduced diameter pilot section 22 at the forward end thereof on which the chuck body 16 is centered by means of screws 24 so that the chuck is concentric with the axis 26 about which the spindle rotates.

A plurality of three circular bores 28 are formed in body 16. When viewed from the front face 18 of the chuck, bores 28 are circumferentially equally spaced about axis 26. Bores 28 extend rearwardly from face 18 through body 16 and are similarly inclined radially inwardly in a rearward direction. At their inner ends bores 28 communicate with an enlarged central bore 30 in body 16. Within bore 30 there is slideably arranged an actuator 32 provided with a rearward extension 34 which has a threaded connection as at 36 with an axially reciprocable drawbar 40. Means (not illustrated) on the machine tool are provided for reciprocating drawbar 40. Actuator 32 has a hollow central section 42 surrounded by a circumferential flange 44 having a close sliding fit with the bore 30. At its forward end flange 44 is turned radially inwardly as at 47.

Within each inclined bore 28 there is slideably arranged a cylindrical jaw rod 46. Each jaw rod 46 has a chordal slot 48 formed therein adjacent the rear end thereof. Slots 48 extend in a radial plane relative to the axis 26 of the spindle. The base of each slot is defined by an arcuate surface 49 concentric with axis 26. Each slot 48 has a close sliding fit with the inwardly extending flange 47 of actuator 32. The inner periphery of flange 47 is generally circular as indicated at 51. As is shown in FIG. 3, at one portion thereof flange 47 has a clearance slot 50 formed therein through which the rear end of each jaw rod 46 is adapted to be passed. Thus, to assembly the jaw rods with the chuck, actuator 32 is rotated in successive increments to align access opening 50 with the inner end of each successive jaw rod so that each rod will be interengaged with flange 47 as illustrated in FIG. 1. Thereafter actuator 32 is rotatively indexed to permit the remaining jaw rods to be so engaged with the actuator. An axially extending slot 53 on the outer periphery of actuator 32 is adapted to be slideably engaged by a screw 52 to prevent further rotation of actuator 32 after all of the jaw rods have been assembled with the chuck. Likewise, each jaw rod is provided with an axially extending slot 54 slideably engaged by the inner end of a pin 56 to prevent relative rotation between each jaw rod and chuck body 16.

At its outer end each jaw rod is formed with a radially inwardly facing seat 58 for receiving a jaw 60. Jaws 60 are securely mounted on the forward ends of jaw rods 46 by means of screws 62.

Chuck body 16 is formed with a central axial bore 64 and actuator 32 is likewise formed with a central axial bore 66. Bores 64, 66 are axially aligned and adapted to support an ejector rod 68 slideably arranged within these bores. At its rear end, ejector rod 68 is connected to a suitable mechanism on the machine tool for reciprocating rod 68 axially. At its forward end ejector rod 68 extends through a guide bushing 70 mounted on the front face 18 of the chuck by means of screws 72. Ejector rod 68 is prevented from rotating relative to the chuck by means of a screw 74 in guide bushing 70 which engages in an axially extending slot 76 in the ejector rod. A stop 78 is secured to the front end of ejector rod 68 by a screw 80.

In FIG. 1 jaws 60 are illustrated in gripping relation with a workpiece 82, the end of which abuts stop 78. In this condition of the chuck, jaw rods 46 are in their retracted position. In this position it will be observed that there is at least a slight clearance 84 between the inner periphery of flange 47 and the inner ends of the chordal slots 48 in jaw rods 46. Likewise, at this time the forward face 86 of actuator 32 is spaced rearwardly of the front face 88 of the chamber defined by bore 30 in chuck body 16. The rear face 90 of actuator 32 is spaced forwardly of the front end face 92 of spindle 12. It will also be noted that with the jaws 60 in the workgripping position illustrated in FIG. 1 there is a clearance space 94 between the outer periphery of ejector rod 68 and the radially chamfered surface 96 at the inner ends of each jaw rod.

With the parts of the chuck so related as described above it will be appreciated that in response to axial reciprocation of drawbar 40 jaws 60 are displaced radially to release and grip a workpiece 82. When drawbar 40 is shifted axially forwardly the interengagement of flange 47 with slots 48 in jaw rods 46 causes the jaw rods to be shifted in a direction outwardly of their bores 28. When this occurs, each jaw 60 is displaced in a direction radially outwardly and forwardly. When drawbar 40 is retracted the opposite movement occurs and jaws 60 are retracted radially and axially inwardly to grip the workpiece 82 and displace it firmly against the front face of stop 78. After the necessary operations are performed on the workpiece 82 the drawbar 40 is actuated to release the workpiece and an ejector rod 68 is displaced forwardly to eject the workpiece.

With the arrangement illustrated it will be appreciated that if ejector rod 68 is removed there is provided a central passageway through the chuck formed by bores 64, 66. This passageway can be used for conducting coolant through the chuck and to the surfaces of the workpiece being machined. The coolant thus directed through the chuck would be discharged at the front face thereof and directed axially forwardly between the jaws and over the workpiece by any suitable means. With such an arrangement the flow of coolant through the chuck would be confined to the central passageway defined by bores 64, 66 by the seals 98 around each jaw rod 46 and the seal 100 around the outer periphery of actuator 32. It will also be appreciated that, if ejector rod 68 is removed, the central bore 64 can accommodate a central portrusion or extension on the end of the workpiece.

I claim:

1. A chuck having a body adapted to be mounted on the front end of a rotary spindle of a machine tool, said body having a cylindrical chamber therein concentric with the central axis of the chuck, said chuck body having a front face and a central axial passageway extending from said chamber through said front face, said chuck body also having a plurality of circumferentially spaced bores extending axially rearwardly from said front face to said chamber in a direction inclined radially inwardly, a jaw rod slideably arranged in each of said inclined bores and extending from said front face into said chamber, a radially extending jaw mounted on the outer end of each of the jaw rods such that the jaws are displaced radially in response to axial movement of the jaw rods, each of said jaw rods having a chordal slot in the radially outer side thereof, means for sliding the jaw rods axially simultaneously in their respective bores comprising an actuator axially slideable in said chamber, said actuator having a passageway therethrough communicating with the central axial passageway in said body, said actuator having means thereon for connection with an axially slideable drawbar at the axis of the machine spindle, said actuator at its forward end extending around the inner ends of said jaw rods and having radially inwardly extending flange means thereon having a close sliding fit with the chordal slots in said jaw rods, the inner ends of the jaw rods terminating radially outwardly of said central axial passageway in said body.

2. A chuck as called for in claim 1 wherein the passageway in said actuator is axially aligned with the passageway in said body.

3. A chuck as called for in claim 2 including an axially shiftable ejector rod slideably mounted in said passageway and extending to the front face of said body.

4. A chuck as called for in claim 1 wherein said actuator comprises a centrally apertured disc having an axially forwardly extending circumferential flange around its outer periphery, said flange means extending radially inwardly from the forward end of said circumferential flange.

5. A chuck as called for in claim 1 wherein said actuator is rotatable within said chamber about said central axis, said flange means having an access opening therein, said actuator being rotatable to align said access opening successively with the inner end of each of said bores to permit interengagement of the flange means with the chordal slots in each of the successive jaw rods.

6. A chuck as called for in claim 5 including means for locking said actuator against rotation in said body in a position wherein said access opening is out of registration with any of said bores.

7. A chuck as called for in claim 1 including seal means for restricting the flow of fluid through the chuck through the passageways in said actuator and body.

8. A chuck as called for in claim 1 wherein the radially inner ends of said jaws define a circle concentric with the central passageway in said body.

9. A chuck as called for in claim 8 wherein the diameter of said circle is at least as large as the opening defined by the passageway in said body at the front face thereof.

10. A chuck as called for in claim 9 wherein said jaws extend radially inwardly from the outer ends of said jaw rods.

11. A chuck as called for in claim 5 wherein the inner ends of said chordal slots define a generally cylindrical surface concentric with the central axis of said chuck.

12. A chuck as called for in claim 10 wherein the radially inner edge portions of said flange means defines a generally cylindrical surface concentric with and spaced radially outwardly from the cylindrical surface defined by the inner ends of said chordal slots.

* * * * *